June 18, 1940.  F. H. GULLIKSEN  2,205,253

SYNCHRONIZING DEVICE FOR SYNCHRONOUS MOTORS

Original Filed Nov. 13, 1934

WITNESSES:

INVENTOR
Finn H. Gulliksen.
BY
Paul E. Friedeman
ATTORNEY

Patented June 18, 1940

2,205,253

UNITED STATES PATENT OFFICE 2,205,253

SYNCHRONIZING DEVICE FOR SYNCHRONOUS MOTORS

Finn H. Gulliksen, Wilkinsburg, Pa., assignor to Westinghouse Electric & Manufacturing Company, East Pittsburgh, Pa., a corporation of Pennsylvania Application November 13, 1934, Serial No. 752,825
Renewed May 8, 1939

11 Claims. (Cl. 171—118)

My invention relates to control systems for motors, and more particularly to systems of control for controlling the starting sequence of synchronous motors.

One object of my invention is to provide for so controlling the starting operation of a synchronous motor that the maximum pull-in torque is secured.

To better understand the broad object just mentioned, a brief statement of the problems involved in starting a synchronous motor may be very desirable. A synchronous motor, as such, has no starting torque and synchronous motors are therefore usually started as induction motors. With the devices heretofore on the market provision was made to excite the field of the synchronous motor when the slip of the motor had been reduced to a small value or, what amounts to the same thing, when the motor has attained some high per cent of synchronous speed. Various manually operable schemes and automatically operable schemes are on the market.

In the automatic control systems, provision is made to energize the field winding of the synchronous motor either a definite time after the motor has been energized or when the motor has attained some selected per cent of synchronous speed. Also in some applications attempts are made to energize the field winding of the synchronous motor not only at some specified percentage of synchronous speed, but also with the correct polarity. All of these devices do not provide for a maximum pull-in torque, since the field is not excited at a time that has any definite relation with reference to the phase of the alternating current supplied to the synchronous motor. The synchronous motor therefore when energized with direct current, causes surges in the supply circuit, and causes other undesirable operating characteristics. Or, as is often the case, a synchronous motor may be operating a compressor in connection with which means are provided to unload the motor during the starting cycle and to load the motor substantially simultaneously with the energization of the field winding. If the time position of the rotor or field winding is not properly selected with reference to the phase of the alternating current supplied to the motor, the motor may slip several poles or even drop the load that was applied at the time the field was energized.

It is an object of my invention to energize the field winding of a synchronous motor at such a time, with reference to the phase of the alternating current supplied to the motor that maximum pull-in torque is secured.

Another object of my invention is to energize the field winding of a synchronous motor during the starting cycle at a time having a definite relation to a selected point on a wave of the alternating current supplied to the motor when the motor has attained a high per cent of synchronous speed.

A still further object of my invention is to energize the field winding of the synchronous motor with the correct polarity and at a time when substantially synchronous speed has been obtained by the motor, and at a time having a definite relation to the pole positions of the rotor with reference to the rotating field in the stator.

Other objects and advantages will become more apparent from a study of the following specification when considered in conjunction with the accompanying drawing in which.

Figure 1:
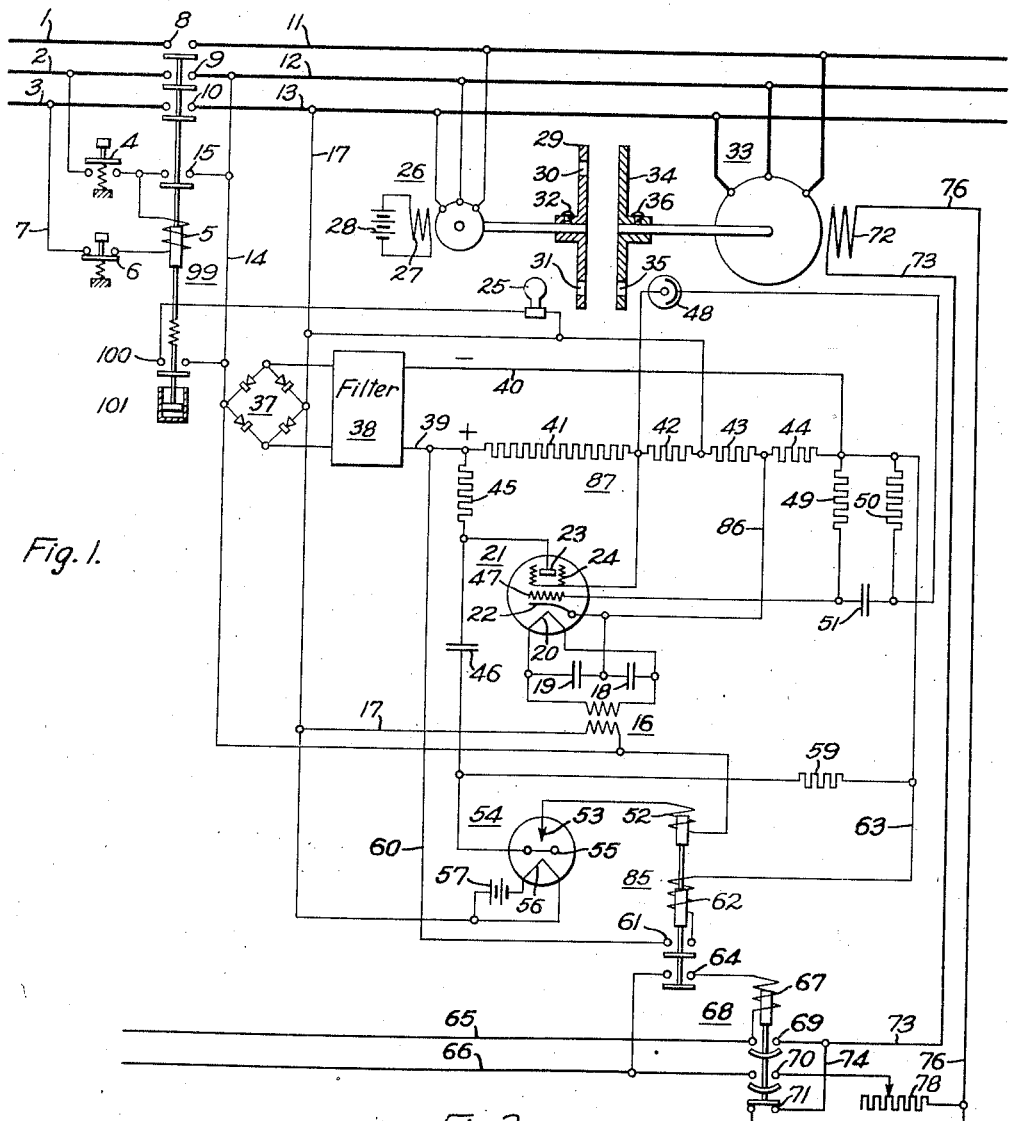
Figure 1 is a diagrammatic showing of my invention.

Referring more particularly to Fig. 1, the reference character 33 designates a synchronous motor which is adapted to be connected to buses 1, 2 and 3 by the switches 8, 9 and 10. The synchronous motor 33 is provided with a disc 34 which may be adjusted to have a definite relation to the pole pieces of the rotor and which disc is provided with a plurality of slots 35, namely, one slot for each pair of poles of the synchronous motor. These slots are uniformly distributed along a circle on the disc concentric with the shaft of the synchronous motor and the disc.

A second synchronous motor 26 is also adapted to be connected to the buses 1, 2 ad 3 by the switches 8, 9 and 18 of the main line contactor 99. This synchronous motor is provided with a field winding 27 energized from a suitable source 28 and may be a very small motor such as a clock motor. The shaft of this synchronous motor 26 is provided with a disc 29 similar to the disc 34. The disc 29 is designed to be adjustable on the shaft of the synchronous motor 26 and is provided with a plurality of apertures 30 and 31 disposed 180 electrical degrees apart, and positioned on disc 29 at equal distances from the shaft of motor 26 and arranged to cooperate with the apertures 35.

A photocell 48 and a source of light 25 are so disposed with reference to the discs 29 and 34 that light may fall on the photocell from the source of light each time the phase of the alternating current and time position of the slots correspond. The grid 47 of suitable amplifier tube 21 is interconnected with the photo-tube 48. The amplifier tube 21 therefore will be caused to break down each time the phase and time position of the slots correspond, namely, each time the photocell 48 receives light from the source of light 25.

A glow tube 54 is adapted to be interconnected with the source of alternating current and has a grid 55 which is controlled by the amplifier tube 21. The circuit arrangement is such that the glow tube is energized or will break down only during the time when the plate voltage is positive, provided the photocell obtains a light impulse during such time. It is therefore clear that by properly positioning the discs on the shafts of the respective synchronous motors and providing proper control circuits any selected point on the positive portion of the alternating current waves supplied to the synchronous motors may be selected for the break down of the glow tube 54. The glow tube 54 controls the energization of a field control relay 85 which, in turn, causes the energization of the field contactor 68 so that the field winding 72 of the synchronous motor may be connected to the source of direct current power indicated by the buses 65 and 66 with the correct polarity and at a time having a definite relation to a selected point on the waves of alternating current supplied to the synchronous motor.

A better understanding of my invention can probably be had from a study of the sequence of operation of the synchronous motor during a normal starting cycle. Assuming that the attendant wishes to start the synchronous motor 33, he depresses the starting switch 4 thereby establishing a circuit from conductor 2 of the buses 1, 2 and 3, through the switch 4, actuating coil 5 of the line contactor 99, stop switch 6, and conductor 7 to the bus 3. Energization of the coil 5 causes the operation of the line contactor which closes the switches 8, 9 and 10, thereby energizing the conductors 11, 12 and 13. Closure of the switch 9 establishes a holding circuit for the line contactor which circuit may be traced from the bus 2 through switch 9, conductor 14 and contact members 15 to the actuating coil 5.

The amplifier tube 21 is of the type requiring some time for the heating of the cathode to a proper high temperature and in consequence the filament 20 of the amplifier tube 21 is connected to be energized immediately upon the closing of the line contactor. The energization is effected through the transformer 16 having its primary connected to the buses 12 and 13 by the conductors 14 and 17. The filament 20 is connected to the secondary of the transformer 16, the filament 20, however, is not the cathode of the amplifier tube 21, but merely heats the cathode 22 which is connected by a conductor intermediate a pair of condensers 18 and 19 connected across the secondary of the transformer 16. The cathode 22 is thus connected at a neutral point with reference to the alternating current and its negative bias is secured by an appropriate connection to a certain point of the control resistors 87 by a conductor 86.

Energization of conductors 11, 12 and 13 causes the operation of the synchronous motor 33 operating as an induction motor and also causes the operation of the synchronous motor 26. Since the synchronous motor 26 is a small motor operating at substantially no load, it will readily pull into synchronism, operating the disc 29 in synchronous relation to the alternating current supplied to the motor. The disc 34, however, being connected to the shaft of the motor 33, will operate at the same speed as the motor 33, namely at a slip with reference to the disc 29.

It will be noted that the source of light 25 is connected across the energized conductors 14 and 17 through the contact members 100 of a timing means controlled by the main line contactor 99 and is therefore in operation, after a definite time, to energize the photocell 48 should the apertures 31 and 35 be in the proper position, for instance, the position shown in Fig. 1. The time of closing of contact members 100 is so chosen that the motor 33 will be somewhere near synchronism when the light 25 is energized.

A rectifier 37 is connected directly across the energized conductors 14 and 17, the direct current terminals of the rectifier 37 are interconnected with a filter 38 which filters out any undesirable oscillations in the direct current whereby the conductors 39 and 40 are supplied with a uniform direct current, the conductor 39 being positive and the conductor 40 being negative. It should be noted that the cathode 22 being connected intermediate the resistors 43 and 44 and near the junction of the conductor 40 will have a negative bias. The anode 23 of the amplifier tube 21, on the other hand, is connected through a resistor 45 to the positive conductor 39. In other words, the anode 23 and cathode 22 are connected across resistors 45, 41, 42 and 43. The auxiliary grid 24 is merely positioned about the anode 23 to selectively control the initial bias of the anode 23 with reference to the cathode 22.

The control grid 47 of the amplifier tube 21 is interconnected with the photo-tube 48, the pair of resistors 49 and 50 and a capacitor 51. It will thus be apparent that the grid 47 will have its bias changed each time the light passes through the apertures 31 and 35 from the source of light 25 onto the photocell 48. The current through amplifier tube 21 will thus be caused to increase each time the apertures in the two discs correspond in position.

The glow tube 54, however, has its principal terminals, namely, the anode 53 and the cathode 56 connected to the conductors 14 and 17, respectively. The anode 53 is not connected directly to the conductor 14, but is connected in series circuit relation with the actuating coil 52 of the field control relay 85. The cathode 56 is energized from a suitable source of current as the battery 57. The control grid 55 on the other hand is interconnected with the anode 23 of the amplifier tube 21 through a capacitor 46, and is also interconnected with the negative conductor 40 through a high resistance resistor 59.

The glow tube 54 will break down only if the increase in current of the amplifier tube has some definite relation to the alternating current waves impressed upon the principal electrodes 53 and 56, respectively.

Figure 2:
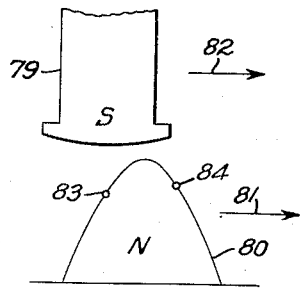
Fig. 2 shows somewhat graphically the pole position of the rotor with reference to a certain point on the curve showing the flux distribution of the rotating field in the stator.

Referring to Fig. 2 of the drawing, if the wave 80 represents the rotating field in the stator moving in the direction indicated by the arrow 81, then the pole position of the rotor, namely the pole piece 79, may be indicated as moving in the direction of the arrow 82 but slipping with reference to the rotating field. By a proper positioning of the discs 29 and 34 and the coaction of the electrical system of control provided, any point on the wave 80 may be selected for the break down time of the glow tube 54. All points, however, do not provide maximum pull-in torque but by appropriate adjustment of the discs 29 and the electric control system, taking into account the time constants of the field control relay 85 and the field contactor 68, and the polarity of the direct current in the buses 65 and 66, a point on the wave 80 may be selected which will give maximum pull-in torque for the synchronous motor 33.

In the particular showing of Fig. 2, the point 83 is designated as the point of maximum pull-in torque, but it is to be understood that the point is arbitrarily selected because the time constants of the various actuating units beyond the glow tube 54 may cause the point 83 to take any other position, as for instance the point 84. The important feature is that any position on the wave can be selected, and once selected, the motor will always start in a predetermined manner and will automatically pull into synchronism with a maximum pull-in torque.

If the photocell 48 is energized, namely, if the phase and time position of the slots correspond, and the bias of the grid 55 has some desired relation with the changing potential of the anode 53 and cathode 56, then the glow tube 54 will become conducting. An energized circuit is thus established from the conductor 14 through the actuating coil 52, anode 53 and cathode 56, to the energized conductor 17. Energization of the coil 52 causes the operation of the field control relay 85 to close the contact members 61 and 64. Closing of the contact members 61 establishes a circuit from the positive conductor 39 through conductor 60, contact members 61, actuating coil 62 and conductor 63 to the negative conductor 40. The field control relay 85 thus remains energized even though the glow tube 54 becomes deenergized as the potential on the principal electrodes 53 and 56 changes.

Operation of the field control relay 85 establishes a circuit from the bus 66, contact members 64 and actuating coil 67 of the field contactor 68 to the energized bus 65. Operation of the field contactor 68 causes the closing of the contact members 69 and 70 and immediately thereafter the opening of the contact members 71. The field winding 72 is thus connected directly to the direct current buses 65 and 66. The circuit for the field winding may be traced from conductor 65 through contact members 69, conductor 73, field winding 72, conductor 76, field rheostat 78 and contact members 70 to the energized conductor 66. The opening of the contact members 71 immediately after the closing of the contact members 69 and 70 removes the discharge circuit for the field winding 72 through the discharge resistor 75. The movable contact portions of the contact members 69, 70 and 71 are resilient so that the field winding 72 is at no time on open circuit during the operation of the field contactor 68. This is also true when the field contactor 68 is deenergized, namely contact members 71 are closed prior to the opening of contact members 69 and 70.

The conductors 65 and 66 will, of course, be either positive or negative, but whichever polarity they do have is immaterial provided the discs 29 and 34 are properly adjusted with reference to the polarity selected for the conductors. The discs may be adjusted at the manufacturers' shops. The system of control will thus always automatically connect the field winding 72 to its source of direct current with the correct polarity in addition to establishing the circuit at a selected point on the alternating current wave of the alternating current supplied to the synchronous motor.

From the foregoing explanations, it should be apparent that the field winding is energized at a time when the rotor of the auxiliary timing motor 26 has some definite position with reference to the position of the rotor of the motor 33. Or, in other words, the field switch 68 completes its closing operation when a pole piece of a given polarity of the pole pieces for the field windings is in a given position with reference to a certain point on the curve showing the flux distribution of a given pole of the rotating field in the stator.

The subject matter hereinbefore disclosed is believed to be illustrative of my invention because I am fully aware that others, particularly after having had the benefit of the teachings of my invention, can readily devise other circuit diagrams and systems of control for accomplishing the novel results I have hereinbefore set forth, but I do not wish to be limited to the specific arrangement shown, but wish to be limited only by the appended claims and the pertinent prior art.

I claim as my invention:

1. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, control means comprising a glow tube having, an anode and a cathode connected to said source of alternating current, and a control electrode, a control electric discharge device operable a time interval after the armature is connected to the source of alternating current and connected to vary the bias of the control electrode of said glow tube, means cooperable with said electric discharge device, for causing such bias variation to take place each time the time position of a pole piece and a phase of the alternating current correspond, whereby said glow tube will become conducting at a time when a pole piece of a certain polarity has a definite position with reference to a given point on the rotating flux wave of a given polarity produced by the armature windings, and means, operable when said glow-tube becomes conducting, adapted to cause the operation of said switching means.

2. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary synchronous motor, having a stator and a rotor, adapted to be connected to the source of alternating current at the same time the first named synchronous motor is connected to said source of alternating current and designed to operate at synchronous speed in a shorter time interval than the shortest accelerating period of the first named synchronous motor, and switching control means responsive to a certain selected relative position of the rotors of said two motors for causing the operation of said switching means.

3. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary synchronous motor, having a stator and a rotor, adapted to be connected to the source of alternating current at the same time the first named synchronous motor is connected to said source of alternating current and designed to operate at synchronous speed in a shorter time interval than the shortest accelerating period of the first named synchronous motor, switching control means responsive to a certain selected relative position of the rotors of said two motors for causing the operation of said switching means, and time-limit means adapted to delay the operation of said switching control means for a time after the armature windings of the first named motor are connected to said source of alternating current.

4. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary synchronous motor having a rotor and a stator and adapted to be connected to the source of alternating current at such a time that it will be operating at synchronism before the per cent slip of the first named synchronous motor becomes small, photo-electric means adapted to be energized when the rotors of the two motors have a certain selected relative position, and electronic means, controlled by said photo-electric means, adapted to control the operation of said switching means.

5. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary synchronous motor having a rotor and a stator and adapted to be connected to the source of alternating current at such a time that it will be operating at synchronism before the per cent slip of the first named synchronous motor becomes small, photo-electric means adapted to be energized when the rotors of the two motors have a certain selected relative position, and time-limit electronic means, controlled by said photo-electric means, adapted to control the operation of said switching means.

6. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary motor connected to the source of alternating current to be operable at synchronism no later than at a time when the slip of the first mentioned synchronous motor is at a certain low value, and switching control means responsive to a certain relative position of the rotors of the two motors for causing the operation of said switching means.

7. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary motor connected to the source of alternating current to be operable at synchronism no later than at a time when the slip of the first mentioned synchronous motor is at a certain low value, switching control means responsive to a certain relative position of the rotors of the two motors, time-limit means for delaying the time of effective operation of said switching control means for an interval of time after the armature windings are connected to said source of energy, and means responsive to the cooperative action of said switching control means and said time-limit means to effect the operation of said switching means.

8. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary motor operating at synchronism from said source of alternating current, a disc having apertures spaced 180 electrical degrees apart mounted to be driven by the motor, a disc having an aperture for each pair of poles of the first mentioned synchronous motor mounted to be driven thereby, a photo-cell and a source of light so positioned with reference to said discs that the photo-cell will be illuminated each time the phase and time position of the apertures correspond, and electronic means, controlled by the illumination of the photo-cell, and adapted to cause the operation of said switching means.

9. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary motor operating at synchronism from said source of alternating current, a disc having apertures spaced 180 electrical degrees apart mounted to be driven by the motor, a disc having an aperture for each pair of poles of the first mentioned synchronous motor mounted to be driven thereby, a photo-cell and a source of light so positioned with reference to said discs that the photo-cell will be illuminated each time the phase and time position of the apertures correspond, time-limit electronic means controlled by the illumination of the photo-cell, and a glow tube controlled by the time-limit electronic means adapted to cause the operation of said switching means.

10. A control system for a synchronous motor, in combination, a synchronous motor having stator armature windings and rotor field winding wound on pole pieces and starting windings, a source of alternating current, means adapted to connect the armature windings to the source of alternating current, a source of direct current, switching means adapted to connect the field windings to the source of direct current, a relatively small auxiliary synchronous motor operating at synchronism from the said source of alternating current, a disc having apertures spaced 180 electrical degrees apart mounted on the shaft of the auxiliary motor, a disc having an aperture for each pair of poles of the first named synchronous motor mounted on the shaft of the first named motor, a photocell and a source of light so positioned that the photo-cell will be illuminated through the apertures each time a phase and the time position of the apertures correspond, an electric discharge device adapted to be connected to the source of alternating current at the same time the said armature windings are connected to the source and having a time constant whereby said electric discharge device does not become operative before the lapse of a certain time after connection to the source, a discharge tube connected to the source of alternating current and controlled by said electric discharge device when operative whereby said discharge tube becomes conducting at a certain point on one half of the alternating current wave impressed on the tube, and means, operable when said discharge tube becomes conducting, to effect the operation of said switching means.

11. A control system for a synchronous motor, in combination, a synchronous motor having stator armature windings and rotor field windings wound on pole pieces and starting windings, a source of alternating current, means adapted to connect the armature windings to the source of alternating current, a source of direct current, switching means adapted to connect the field windings to the source of direct current, a relatively small auxiliary synchronous motor operating at synchronism from the said source of alternating current, a disc having apertures spaced 180 electrical degrees apart mounted on the shaft of the auxiliary motor, a disc having an aperture for each pair of poles of the first named synchronous motor mounted on the shaft of the first named motor, a photo-cell and a source of light so positioned that the photo-cell will be illuminated through the apertures each time a phase and the time position of the apertures correspond, an electric discharge device adapted to be connected to the source of alternating current at the same time the said armature windings are connected to the source and having a time constant whereby said electric discharge device does not become operative before the lapse of a certain time after connection to the source, a discharge tube connected to the source of alternating current and controlled by said electric discharge device when operative whereby said discharge tube becomes conducting at a certain point on one half of the alternating current wave impressed on the tube, means, operable when said discharge tube becomes conducting, to effect the operation of said switching means, and means for selecting any point on one half of the alternating current wave impressed on the discharge tube to make it conducting.

FINN H. GULLIKSEN.